United States Patent
Ikeda et al.

(10) Patent No.: US 6,535,302 B1
(45) Date of Patent: Mar. 18, 2003

(54) IMAGE PROCESSING APPARATUS AND METHOD

(75) Inventors: Yuichi Ikeda, Numazu (JP); Nobuatsu Sasanuma, Mishima (JP); Tetsuya Atsumi, Susono (JP); Yasuhiro Saito, Shizuoka-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/144,449

(22) Filed: Sep. 1, 1998

(30) Foreign Application Priority Data

Sep. 5, 1997 (JP) .............................. 9-241439

(51) Int. Cl.[7] .................. H04N 1/407; H04N 1/409; H04N 1/58; G06K 15/02
(52) U.S. Cl. .................. 358/3.26; 358/3.02; 358/521; 382/269
(58) Field of Search .................. 358/521, 525, 358/1.1, 1.9, 524, 530, 3.26, 3.02, 3.1, 3.11, 3.12; 382/167, 266, 269; 347/183, 131, 251–254

(56) References Cited

U.S. PATENT DOCUMENTS 4,783,838 A * 11/1988 Matsunawa ............... 382/51
5,123,060 A * 6/1992 Chao et al. ............... 382/51
5,182,575 A    1/1993 Kato et al. ............... 346/108
5,513,016 A * 4/1996 Inoue ....................... 358/456
6,034,794 A * 3/2000 Suganuma ................ 358/518
6,211,893 B1 * 4/2001 Mori et al. ............... 347/183

FOREIGN PATENT DOCUMENTS

EP  0 216 462   4/1987  ............ H04N/1/40
EP  0 401 820   12/1990  ............ B41J/2/36

* cited by examiner

*Primary Examiner*—Scott Rogers
(74) *Attorney, Agent, or Firm*—Fitzpatrick, Cella, Harper & Scinto

(57) ABSTRACT

When pixels in a two-dimensional matrix are divided into lines A and B in the column (or row) direction (sub-scanning direction) and two neighboring pixels in the row (or column) direction are subjected to gradation correction respectively using characteristic curves for lines A and B, the characteristic curve for line B unpreferably has a stepwise characteristic portion having a step when it is stored in an LUT, due to quantization errors unique to digital values. Hence, the characteristic curve for line A is set to be decreased by the amount corresponding to the step.

33 Claims, 18 Drawing Sheets

IMAGE PROCESSING APPARATUS AND METHOD

BACKGROUND OF THE INVENTION

The present invention relates to an image processing apparatus and method for performing, e.g., gradation correction of an input image.

In an image processing apparatus which reproduces an original image on the basis of a digital image signal, when an image is formed at high resolution, in general, graininess (coarseness of the image) becomes conspicuous in a bright (highlight) portion of the reproduced image due to unstable reproduction of individual pixels. Especially, in an electro-photographic digital copying machine as a typical image processing apparatus, as the γ characteristic curve of a γ correction unit has a larger slope, the image is readily influenced by discharging non-uniformity arising from the contaminated charging surface of a charger, which charges a photosensitive drum, resulting in a considerable reproducibility drop of, in particular, a halftone image. For this reason, a scheme for reducing the coarseness of the highlight portion of the reproduced image by performing gradation correction between two neighboring pixels has been proposed.

As an example of the technique for performing gradation correction between two neighboring pixels, assume that the signal levels of a plurality of pixels in a two-dimensional matrix are corrected using a plurality of characteristic curves pre-stored in, e.g., a look-up table (to be abbreviated as an LUT hereinafter).

In such case, a desired characteristic curve shape cannot often be accurately expressed by a digital value stored in the LUT due to quantization errors unique to digital values. For example, when the tangent to a desired characteristic curve has a small slope, data which can be actually stored in the LUT as that characteristic curve represent step-like characteristics locally having steps. After gradation correction is done using such characteristic curve, gradation changes stepwise in accordance with the signal levels corresponding to step portions of the characteristic curve in an output gradation pattern. With this pattern, when an actual original image is reproduced, an unwanted pseudo edge appears in the reproduced image.

SUMMARY OF THE INVENTION

It is, therefore, an object of the present invention to provide an image processing apparatus and method having good gradation reproducibility.

In order to achieve the above object, an image processing apparatus of the present invention is characterized by comprising the following arrangement.

That is, there is provided an image processing apparatus comprising correction means for performing gradation correction of odd- and even-line pixels neighboring in a predetermined scanning direction of an image represented by an input image signal in accordance with a plurality of types of correction information having different characteristics, wherein one of the plurality of types of correction information represents a downward convex correction characteristic curve, and at a given signal level of the input image signal where the correction information that represents the downward convex curve changes stepwise, another correction information changes in correspondence with the stepwise change.

There is also provided an image processing apparatus comprising correction means for performing gradation correction of odd- and even-line pixels neighboring in a predetermined scanning direction of an image represented by an input image signal in accordance with a plurality of types of correction information having different characteristics, wherein when the plurality of types of correction information respectively represent downward convex correction characteristic curves, and one of the plurality of types of correction information that represent the downward convex curves changes stepwise at a given signal level of the input image signal, another correction information which is different from the correction information that represents the downward convex curve which changes stepwise is corrected, so that a difference between a sum of corrected signal levels of the odd- and even-line pixels obtained when the odd- and even-line pixels at a first signal level of the input image signals are corrected by the correction means in accordance with the correction information that represents the downward convex curve which changes stepwise, and a sum of corrected signal levels of the odd- and even-line pixels obtained when the odd- and even-line pixels at a second signal level different a predetermined level from the first signal level of the input image signal are corrected by the correction means in accordance with the correction information that represents the downward convex curve which changes stepwise, assumes a predetermined value.

There is also provided an image processing apparatus for performing correction of an input image signal using a plurality of neighboring pixels as one unit, wherein in a change portion of a first correction curve applied to one of the plurality of pixels, a change in second correction curve applied to another one of the plurality of pixels corresponds to the change in first correction curve.

Furthermore, there is provided a computer readable storage medium which pre-stores correction information which represents the correction curve having the above-mentioned characteristics.

In order to achieve the above object, an image processing method of the present invention is characterized by comprising the following feature.

That is, there is provided an image processing method for performing gradation correction of odd- and even-line pixels neighboring in a predetermined scanning direction of an image represented by an input image signal in accordance with a plurality of types of correction information having different characteristics, wherein one of the plurality of types of correction information represents a downward convex correction characteristic curve, and at a given signal level of the input image signal where the correction information that represents the downward convex curve changes stepwise, another correction information changes in correspondence with the stepwise change.

There is also provided an image processing method for performing gradation correction of odd- and even-line pixels neighboring in a predetermined scanning direction of an image represented by an input image signal in accordance with a plurality of types of correction information having different characteristics, wherein when the plurality of types of correction information respectively represent downward convex correction characteristic curves, and one of the plurality of types of correction information that represent the downward convex curves changes stepwise at a given signal level of the input image signal, another correction information which is different from the correction information that represents the downward convex curve which changes stepwise is corrected, so that a difference between a sum of corrected signal levels of the odd- and even-line pixels obtained when the odd- and even-line pixels at a first signal level of the input image signals are corrected in accordance with the correction information that represents the downward convex curve which changes stepwise, and a sum of corrected signal levels of the odd- and even-line pixels obtained when the odd- and even-line pixels at a second signal level different a predetermined level from the first signal level of the input image signal are corrected in accordance with the correction information that represents the downward convex curve which changes stepwise, assumes a predetermined value.

There is also provided an image processing method for performing correction of an input image signal using a plurality of neighboring pixels as one unit, wherein in a change portion of a first correction curve applied to one of the plurality of pixels, a change in second correction curve applied to another one of the plurality of pixels corresponds to the change in first correction curve.

Other objects, features and advantages of the invention will become apparent from the following detailed description taken in conjunction with the accompanying drawings.

DESCRIPTION OF THE PREFERRED EMBODIMENTS

An embodiment in which the present invention is applied to an electrophotographic color digital copying machine as a typical image processing apparatus will be described in detail hereinafter with reference to the accompanying drawings.

First Embodiment

<Digital Copying Machine>

The overall arrangement and image formation of a digital copying machine will be explained below with reference to FIGS. 1 and 2.

Figure 1:
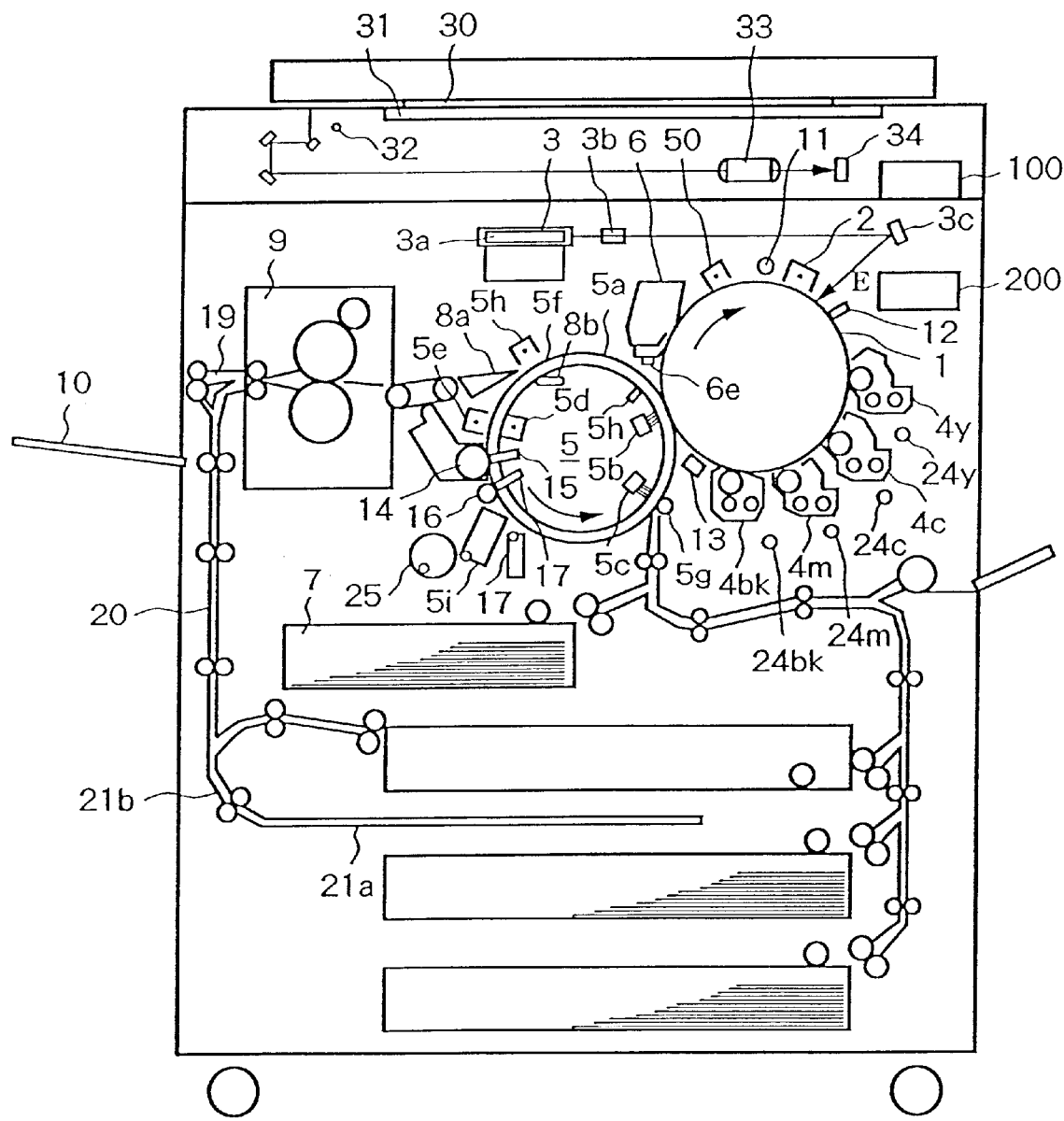
FIG. 1 is a schematic sectional view showing the arrangement of a digital copying machine according to the first embodiment of the present invention.

FIG. 1 is a schematic sectional view showing the arrangement of a digital copying machine according to the first embodiment of the present invention.

Figure 2:
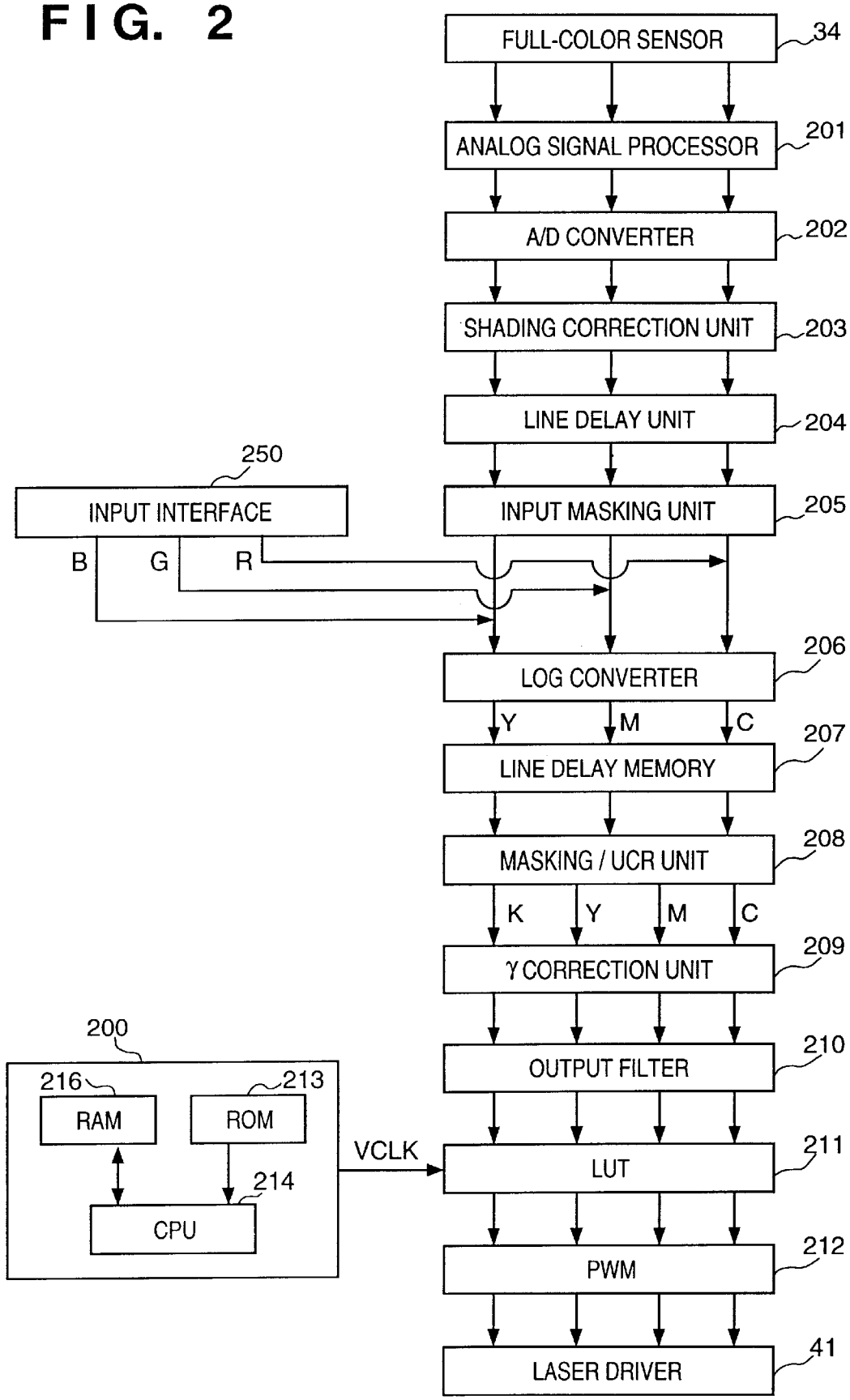
FIG. 2 is a block diagram of image formation in the digital copying machine according to the first embodiment of the present invention.

FIG. 2 is a block diagram of image formation in the digital copying machine according to the first embodiment of the present invention.

The digital copying machine shown in FIG. 1 comprises a reader unit for reading an original image, and a printer unit for reproducing an original image on a recording paper sheet on the basis of the image signal of the read original image. The operations of the reader and printer units to be described below are respectively controlled by controllers 100 and 200. Note that the controller 200 comprises a CPU 214 and controls in accordance with a program pre-stored in a ROM 213. Also, the controller 100 comprises a CPU (not shown), and controls in accordance with a program pre-stored in a ROM, needless to say.

When a copy start key (not shown) is pressed in the reader unit, the controller 100 starts an exposure scan of an original 30 placed on a platen 31 using an exposure lamp 32. A reflected light image from the original 30 obtained by the exposure scan is formed on a full-color sensor 34.

The full-color sensor 34 has R (red), G (green), and B (blue), three-color line sensors which are spaced a predetermined distance in the sub-scanning direction, and each line sensor has an array of a plurality of light-receiving elements. The full-color sensor 34 separates the incoming reflected light image from the original 30 into a plurality of pixels using a plurality of photoelectric conversion elements, and generates photoelectric conversion signals (color-separated image signals) in correspondence with the densities of these pixels.

In FIG. 2, image signals output from the full-color sensor 34 are subjected to gain and offset adjustments in an analog signal processor 201, and are then converted by an A/D converter 202 into, e.g., 8-bit (levels 0 to 255: 256 gradation levels) R, G, and B digital signals in units of color components.

The R, G, and B digital signals input to a shading correction unit 203 are subjected to general shading correction for optimizing their gains in correspondence with individual light-receiving elements so as to remove sensitivity non-uniformity of the arrays of individual light-receiving elements of the full-color sensor 34.

A line delay unit 204 corrects spatial errors included in the image signals output from the shading correction unit 203. These spatial errors are produced since the line sensors of the full-color sensor 34 are spaced a predetermined distance in the sub-scanning direction. More specifically, the R (red) and G (green) color component signals are line-delayed in the sub-scanning direction with reference to the B (blue) color component signal to lock the phases of the three different color component signals.

An input masking unit 205 converts the color space of the image signals output from the line delay unit 204 into, e.g., an NTSC-RGB standard color space by a matrix calculation given by equation (1) below. That is, the color space of the color component signals output from the full-color sensor 34 is determined by the spectral characteristics of the respective color component filters, and is converted into the NTSC-RGB standard color space.

$$\begin{pmatrix} Ro \\ Go \\ Bo \end{pmatrix} = \begin{pmatrix} a11 & a12 & a13 \\ a21 & a22 & a23 \\ a31 & a32 & a33 \end{pmatrix} \begin{pmatrix} Ri \\ Gi \\ Bi \end{pmatrix} \quad (1)$$

where Ro, Go, Bo: output image signals
Ri, Gi, Bi: input image signals

An input interface 250 receives color image data from an external apparatus (not shown) such as a computer or the like, as needed.

A LOG converter 206 comprises a look-up table (LUT) comprised of, e.g., a ROM (not shown) or the like, and converts R, G, and B luminance signals output from the input masking unit 205 into C, M, and Y density signals.

A line delay memory 207 delays the image signals output from the LOG converter 206 only during the period (line delay period) in which a black character determination unit (not shown) generates control signals UCR, FILTER, SEN, and the like on the basis of the outputs from the input masking unit 205.

Note that the control signal UCR controls a masking UCR unit 208. The control signal FILTER is used by an output filter 210 to attain edge emphasis. The control signal SEN is used for increasing the resolution when the black character determination unit (not shown) determines a black character.

The masking UCR unit 208 extracts a black component signal K from the image signals output from the line delay memory 207. Also, the unit 208 outputs frame-sequential 8-bit color component image signals in the order of M, C, Y, and K upon each reading by the reader unit by a matrix calculation of M, C, Y, and K image signals so as to correct any color turbidity of recording color agents in the printer unit. Note that the matrix coefficients used in the matrix calculation are set by the CPU (not shown) in the controller 100.

A γ correction unit 209 performs density correction of the image signals output from the masking UCR unit 208 so as to adjust the image signals to the ideal gradation characteristics of the printer unit. The output filter (spatial filter processor) 210 edge-emphasizes or smoothes the image signals output from the γ correction unit 209 in accordance with the control signal from the CPU (not shown) in the controller 100.

An LUT 211 has an LUT (not shown) for matching the density of an original image with that of an output image, and an LUT according to the present invention (to be described later), and these table data are pre-stored in, e.g., a ROM 213 or the like.

A pulse-width modulator (PWM) 212 outputs pulse signals having pulse widths corresponding to the levels of the image signals input from the LUT 211, and these pulse signals are input to a laser driver 41 (a laser driver 3 in FIG. 1) for driving a laser light source (not shown).

In FIG. 1, a laser beam E emitted by a semiconductor laser in the laser driver 3 is swept by a rotary polygonal mirror 3a, and is imaged as a spot on a photosensitive drum 1 by a lens 3b such as an f-θ lens or the like, and a stationary mirror 3c for directing the laser beam E in the direction of the photosensitive drum 1. The laser beam E scans the photosensitive drum in a direction (main scanning direction) nearly parallel to the rotation shaft of the photosensitive drum 1, and repetitively scans the photosensitive drum 1 in the rotational direction (sub-scanning direction) of the photosensitive drum 1, thus forming an electrostatic latent image.

In the printer unit, the photosensitive drum 1 has amorphous silicon, selenium, OPC, or the like on its surface, and is carried to be rotatable in a direction of the arrow in FIG. 1. Around the photosensitive drum 1, a pre-exposure lamp 11, corona charger 2, laser exposure optical system 3, surface potential sensor 12, four developers 4y, 4c, 4m, and 4bk of different colors, light amount detection means 13 on the photosensitive drum 1, transfer device 5, and cleaning device 6 are placed.

In the printer unit, prior to image formation, the controller 200 rotates the photosensitive drum 1 in the direction of the arrow in FIG. 1, uniformly removes the charge from the surface of the photosensitive drum 1 by light emitted by the pre-exposure lamp 11, and then uniformly charges the surface of the photosensitive drum 1 by the primary charger 2. After that, the photosensitive drum 1 is exposed and scanned by the laser beam E modulated in accordance with the above-mentioned image information signal, so that an electrostatic latent image having area gradation characteristics is formed on the photosensitive drum 1 in correspondence with the image information signal.

The developers 4y, 4c, 4m, and 4bk develop the electrostatic latent image on the photosensitive drum 1 using yellow, magenta, cyan, and black color toners as recording agents. More specifically, the controller 200 forms a negatively charged, resin-based visible image (toner image) on the photosensitive drum 1 by reverse-developing the electrostatic latent image formed on the photosensitive drum using two-component developing agents consisting of toner and carrier by the predetermined developers 4y, 4c, 4m, and 4bk. Such toner is prepared by dispersing each color recording agent using a styrene-based copolymer as a binder. The developers alternately approach the photosensitive drum 1 in correspondence with the separated color upon operation of eccentric cams 24y, 24c, 24m, and 24bk. Note that reverse development is a developing method of visualizing a latent image by applying toner charged to have the same polarity as that of the latent image to the exposed region of a photosensitive body.

The transfer device 5 comprises a transfer drum 5a, a transfer brush charger 5b serving as a transfer means, an attraction roller 5g facing an attraction brush charger 5c for electrostatically attracting a recording paper sheet, an inner charger 5d, an outer charger 5e, and a transfer peel sensor 5h, in this embodiment. A recording paper holding sheet 5f consisting of a dielectric such as polycarbonate or the like is integrally extended in a cylindrical shape on the aperture region of the circumferential surface of the transfer drum 5a, which is rotatably and axially supported.

The controller 200 supplies a recording sheet in a recording sheet cassette 7 to a position facing the photosensitive drum 1 via a convey system and the transfer device 5 at a predetermined timing, and electrostatically holds the sheet on the recording paper holding sheet 5f. The toner image formed on the photosensitive drum 1 is transferred onto the recording sheet on the recording paper holding sheet 5f upon rotation of the transfer drum 5a.

Upon completion of transfer of the toner image of the original image onto the recording sheet, the controller 200 peels the recording sheet from the transfer drum 5a by operating a peeling pawl 8a, peeling push-up roller 8b, and peeling charger 5h, and fixes the toner image onto the recording sheet by a thermal roller fixing device 9. After that, the recording sheet is exhausted onto a tray 10.

The controller 200 cleans the residual toner on the surface of the photosensitive drum 1 by the cleaning device 6 comprised of a cleaning blade 6a and a rake sheet after transfer of the toner image, thus preparing for the next image formation. In order to prevent powders from becoming attached to the recording paper holding sheet 5f of the transfer drum 5a, and prevent oil from becoming attached to the recording sheet, cleaning is done using a fur brush 14 and a backup brush 15 which faces the fur brush 14 via the recording paper holding sheet 5f. Such cleaning is done before or after image formation, and is also performed as needed upon a paper jam.

<Gradation Correction>

In this embodiment, gradation correction is performed in units of two neighboring pixels in the sub-scanning direction by the method to be described below.

Figure 3:
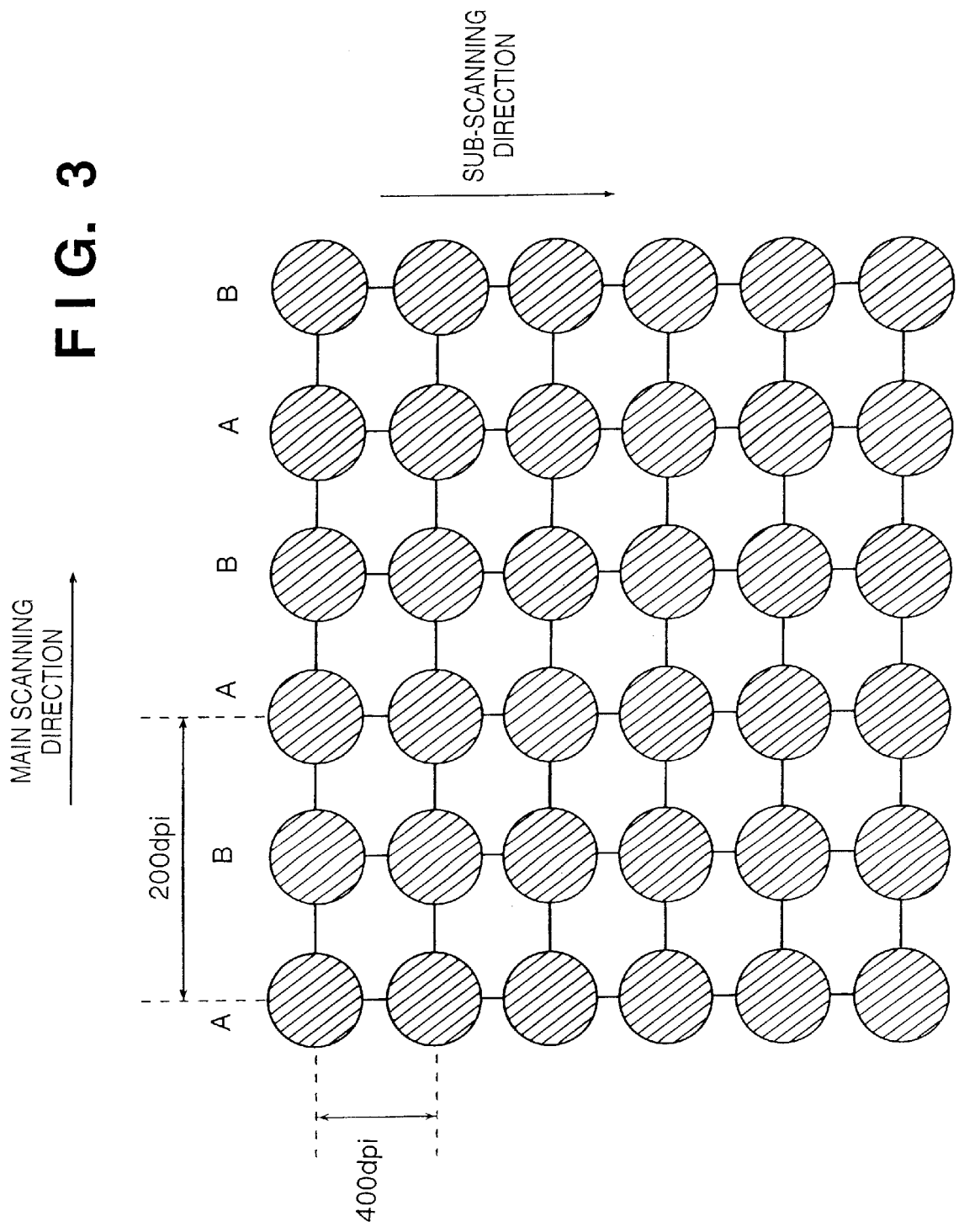
FIG. 3 is a view for explaining the principle of gradation correction according to the first embodiment of the present invention.
Figure 4:
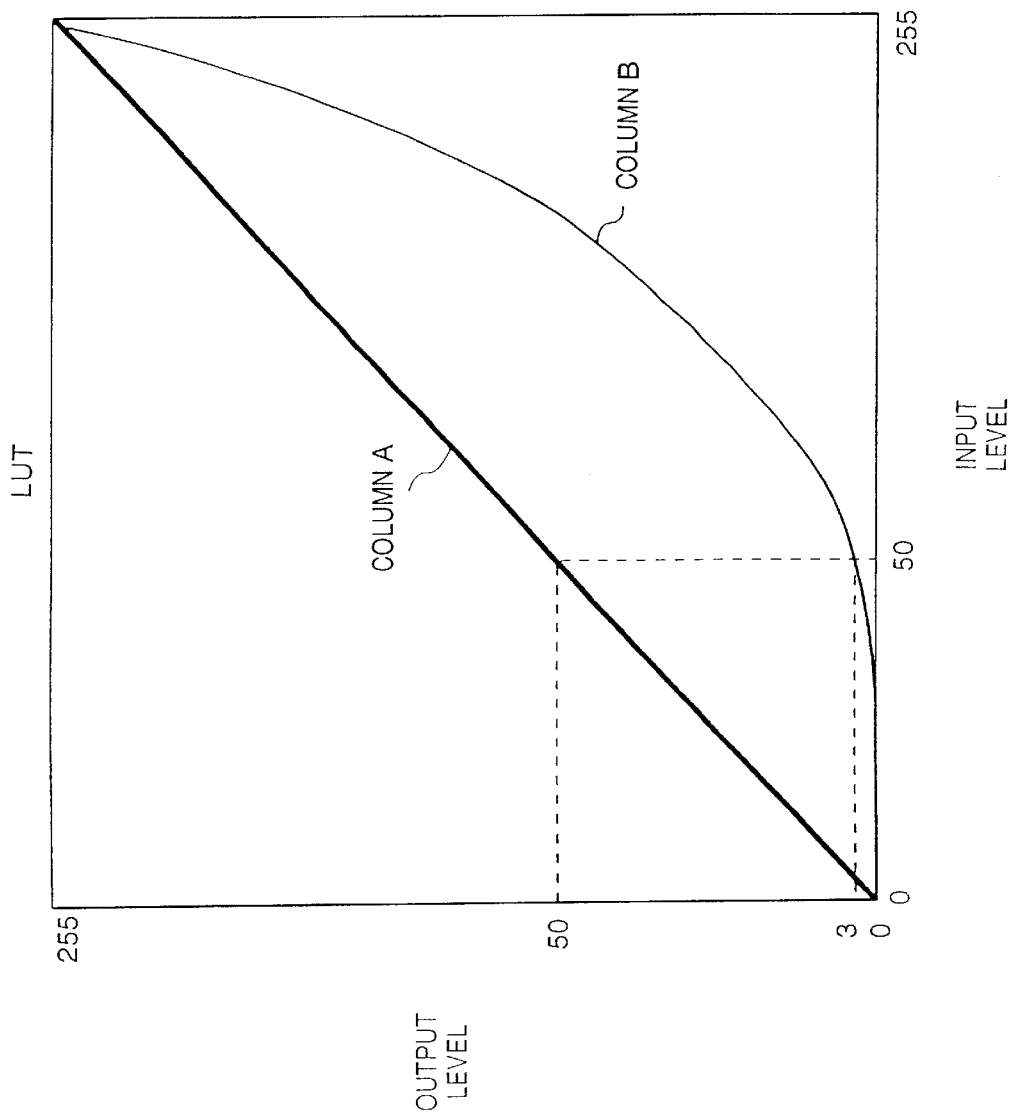
FIG. 4 is a graph showing the characteristics of an LUT which can be basically used in the gradation correction according to the first embodiment of the present invention.

FIG. 3 is a view for explaining the principle of gradation correction according to the first embodiment of the present invention. FIG. 4 is a graph showing the characteristics of an LUT which can be basically used in the gradation correction according to the first embodiment of the present invention.

In the printer unit of the aforementioned image processing apparatus, assume that within the range from levels 0 to 40 of the output 255 levels of input image signals, a latent image and toner image are unstable and the graininess of an image becomes conspicuous upon reproducing an original image. In such case, upon reproducing an original image by the printer unit, image signals having signal levels ranging from levels 0 to 40 should be avoided from being directly reproduced. Hence, individual pixels represented by input image signals are subjected to gradation correction by the principle to be described below.

More specifically, as shown in FIG. 3, a plurality of dot lines extending in the sub-scanning direction are divided in advance like A, B, A, B, . . . , in the main scanning direction. (Note that the apparatus may produce A, B in the manner that a plurality of dot rows extending in the main-scanning direction are divided in advance like A, B, A, B, . . . , in the sub-scanning direction.) Then, pixels in each odd line (to be referred to as line A hereinafter) and those in each even line (to be referred to as line B hereinafter) are subjected to gradation correction using different characteristic curves in the LUT shown in FIG. 4. After such gradation correction, when input image signals of two neighboring pixels in the sub-scanning direction have level 50, the LUT 211 outputs an image signal of level 50 for a pixel in line A, and an image signal of level 3 for a pixel in line B. As a consequence, gradation correction is made in units of two neighboring pixels (those in lines A and B) in the sub-scanning direction.

Figure 5:
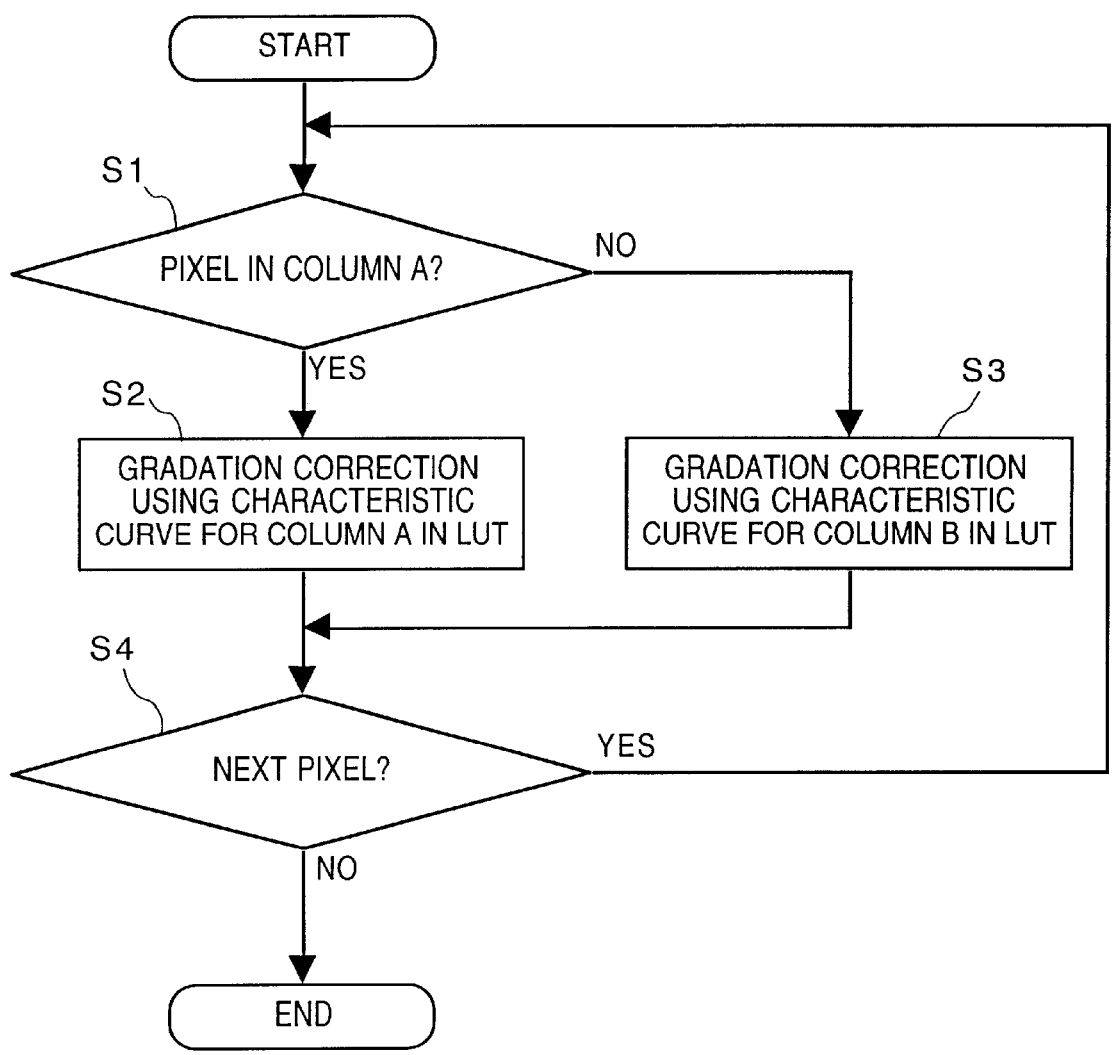
FIG. 5 is a flow chart showing the gradation correction according to the first embodiment of the present invention.

FIG. 5 is a flow chart showing the gradation correction according to the first embodiment of the present invention. Software that implements this processing is pre-stored in the ROM 213, and the CPU 214 executes the processing in accordance with software. In FIG. 5, it is checked in step S1 if the pixel (multi-valued color image data) currently input to the LUT 211 belongs to line A. If YES in step S1, that pixel is subjected to gradation correction using a characteristic curve for line A in the LUT (step S2); otherwise, since that pixel belongs to line B, that pixel is subjected to gradation correction using a characteristic curve for line B in the LUT (step S3). It is checked in step S4 if pixels to be input to the LUT 211 still remain. If YES in step S4, the flow returns to step S1 to continue the processing.

Upon correction of actual pixels, the characteristic curve for line A or B in the LUT can be selected using a pixel clock VCLK.

Figure 6:
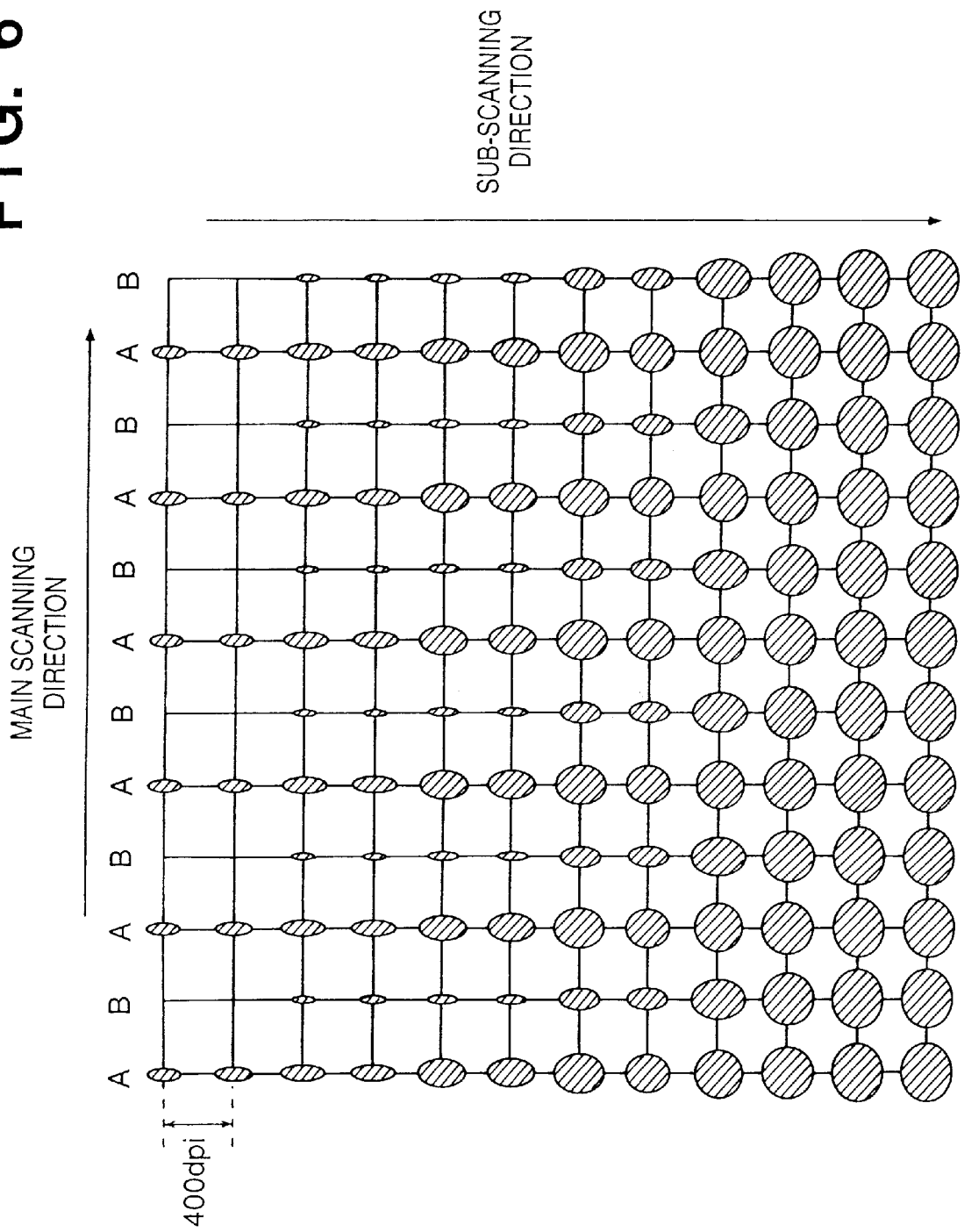
FIG. 6 shows an example of a reproduced image of dots after the gradation correction according to the first embodiment of the present invention.

FIG. 6 shows an example of the reproduced image of dots after gradation correction according to the first embodiment of the present invention. FIG. 6 illustrates the reproduced image of dots which become larger as the input image signals change from lower density to higher density in the sub-scanning direction upon gradation correction using the LUT shown in FIG. 4.

As can be seen from FIG. 6, the resolution is around 200×400 dpi in a low-density region, and increases up to around 400×400 dpi as the density increases. Hence, when the aforementioned gradation correction is made, dots in lines A become stable images, and dots in lines B are unstable. However, since dots in lines B have lower density than those in line A, density fluctuations can be minimized, and a stable reproduced image can be obtained as a whole.

Upon correction using the characteristic curves for lines A and B shown in FIG. 4, the range from input levels 0 to 50 is presented in an enlarged scale as the low-density region in FIG. 4.

Figure 7:
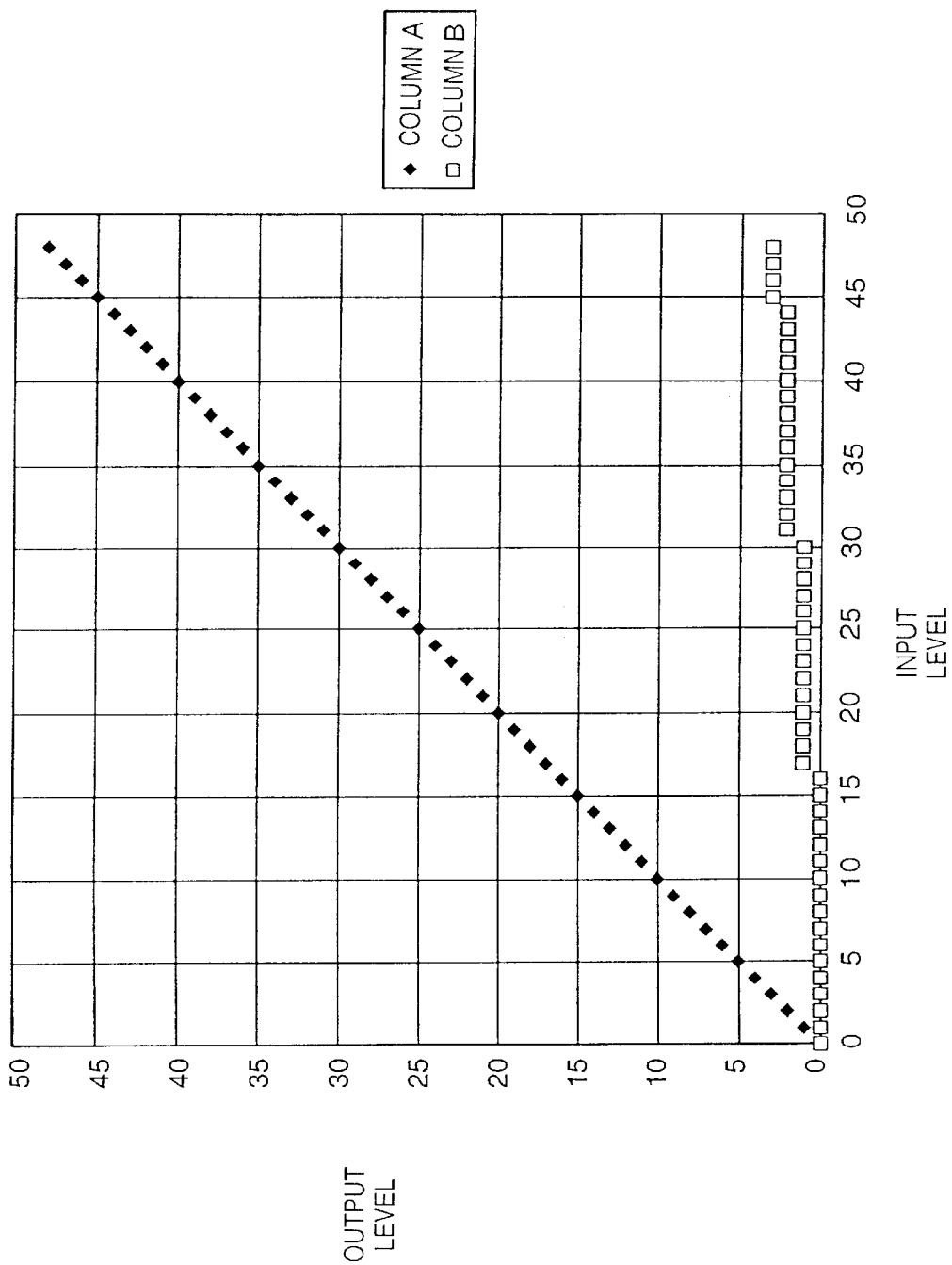
FIG. 7 is a graph showing a low-density region in the LUT shown in FIG. 4 in an enlarged scale.
Figure 8:
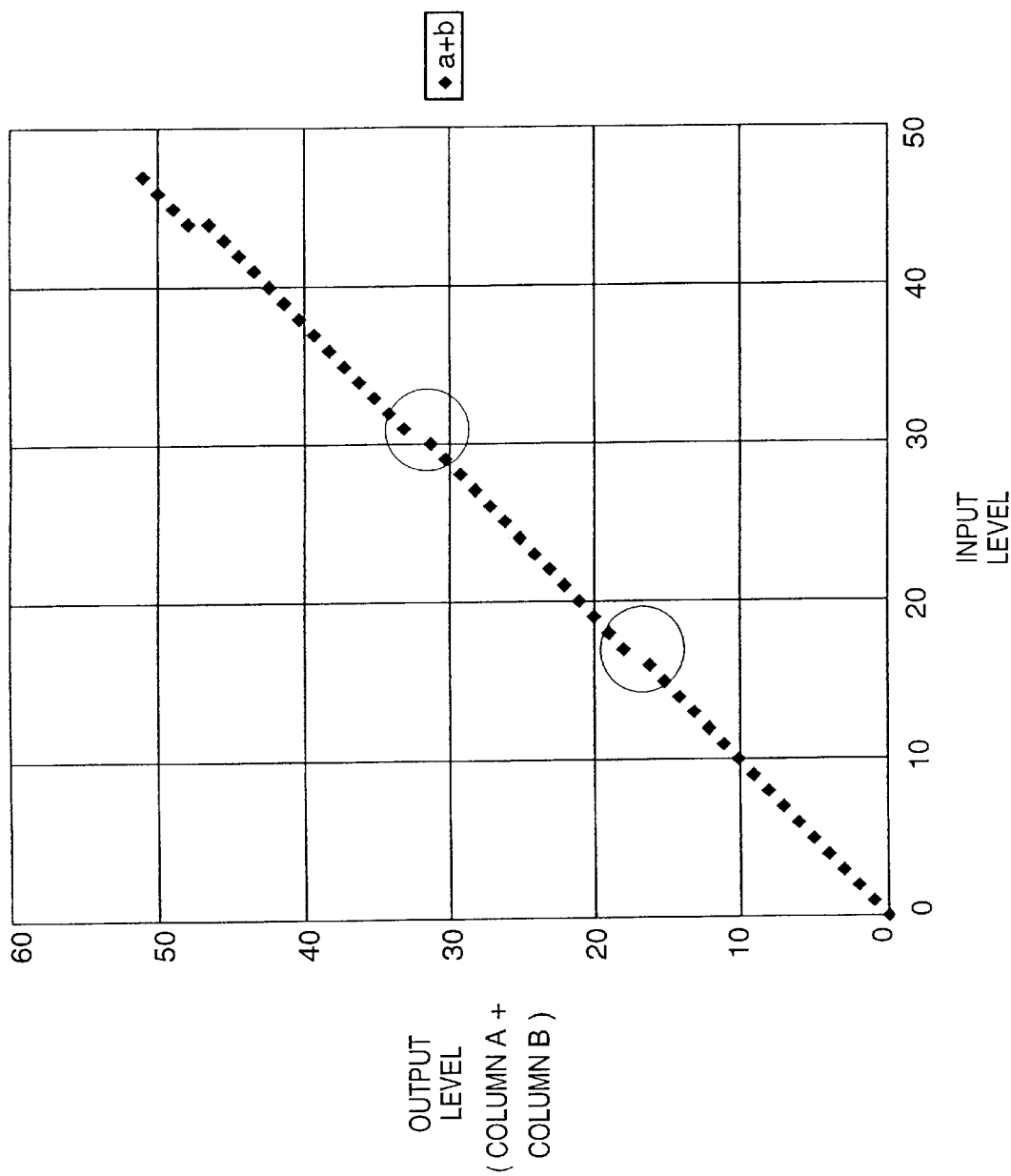
FIG. 8 is a graph showing the synthesized output characteristics of two neighboring pixels using the LUT shown in FIG. 7.

FIG. 7 shows the low-density region in the LUT shown in FIG. 4 in an enlarged scale. As shown in FIG. 7, since the characteristic curve for column A in FIG. 4 has unity slope, it can represent continuous, linear characteristics even when it is stored in the LUT. However, in case of the characteristic curve for line B in FIG. 4, since a tangent to that curve in the low-density region has a small slope, data actually stored in the LUT represent stepwise characteristics having steps, as shown in FIG. 7, owing to quantization errors unique to digital values. FIG. 8 shows the output characteristics obtained when two pixels in lines A and B are processed as one set upon using such LUT, and image signals corresponding to these two pixels have the same input level.

Figure 18:
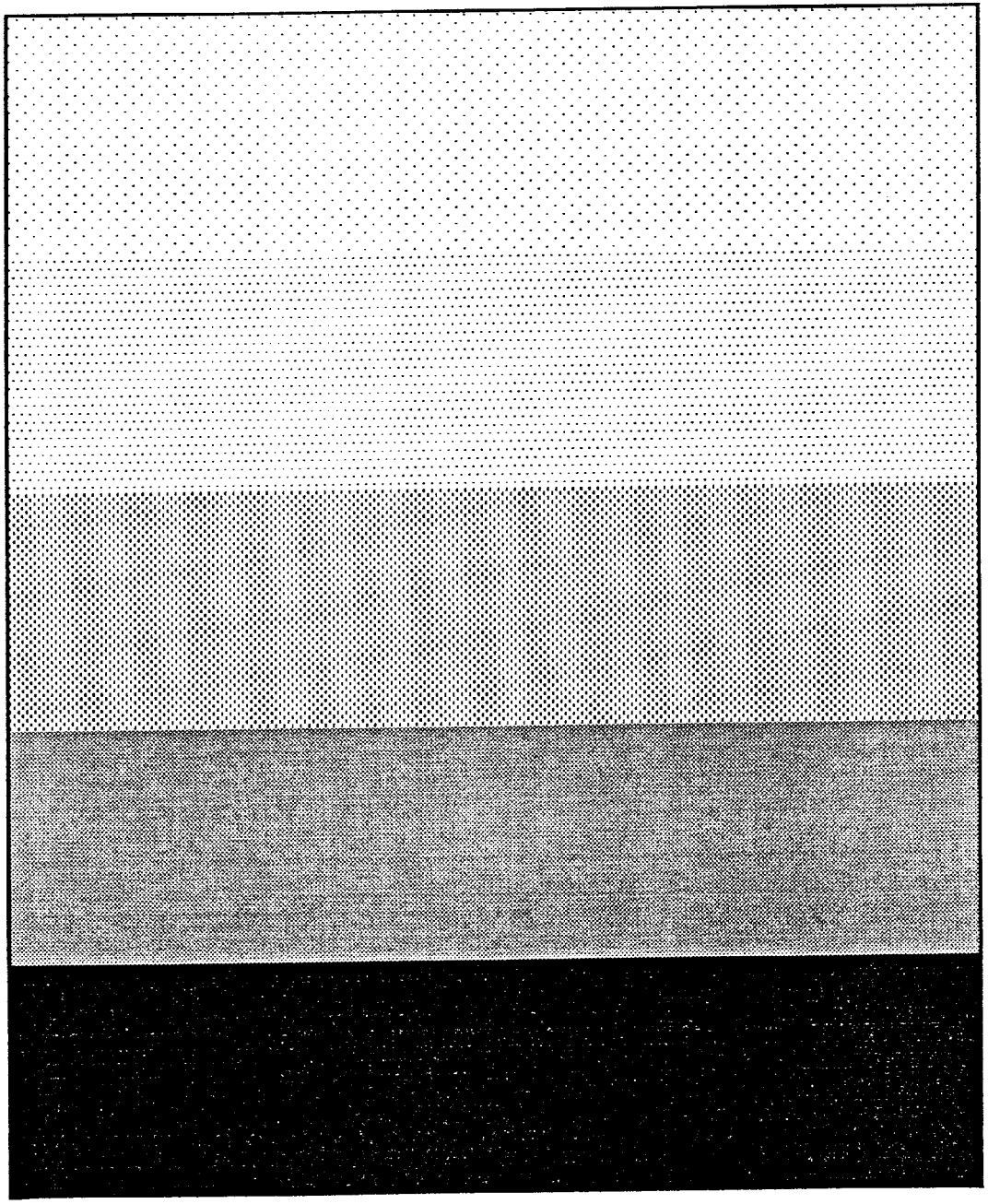
FIG. 18 shows an example of an output gradation pattern after conventional gradation correction using an LUT.

FIG. 8 shows the synthesized output characteristics of two neighboring pixels in the LUT shown FIG. 7. As shown in FIG. 8, the synthesized output characteristics undesirably have steps in portions indicated by circles in FIG. 8 under the influence of the stepwise characteristic curve for line B shown in FIG. 7. Hence, when a gradation pattern is output after gradation correction using the LUT with the output characteristics shown in FIG. 7, the gradation changes stepwise in correspondence with the signal levels corresponding to the steps in the output characteristics in FIG. 7, as shown in FIG. 18.

Figure 9:
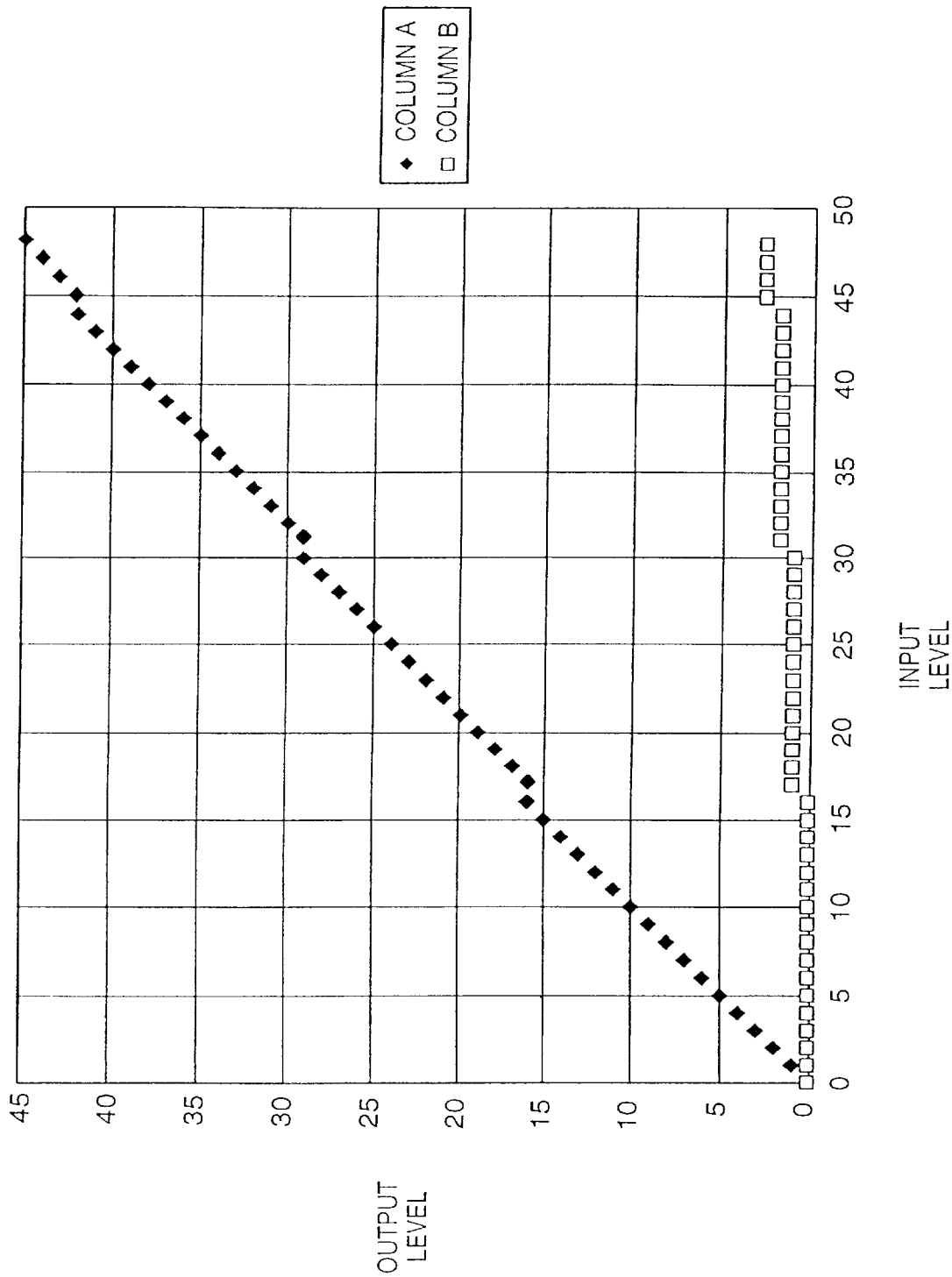
FIG. 9 is a graph showing an LUT for a low-density region according to the first embodiment of the present invention.

In order to prevent such problem, this embodiment uses an LUT shown in FIG. 9 in the low-density region.

FIG. 9 shows an LUT for the low-density region according to the first embodiment of the present invention. As shown in FIG. 9, at input levels (levels 16 and 17, levels 30 and 31, and levels 44 and 45 in FIG. 9) which inevitably change stepwise upon storing the characteristic curve for line B in the LUT, the characteristic curve for line A is set to minimize the steps.

Figure 10:
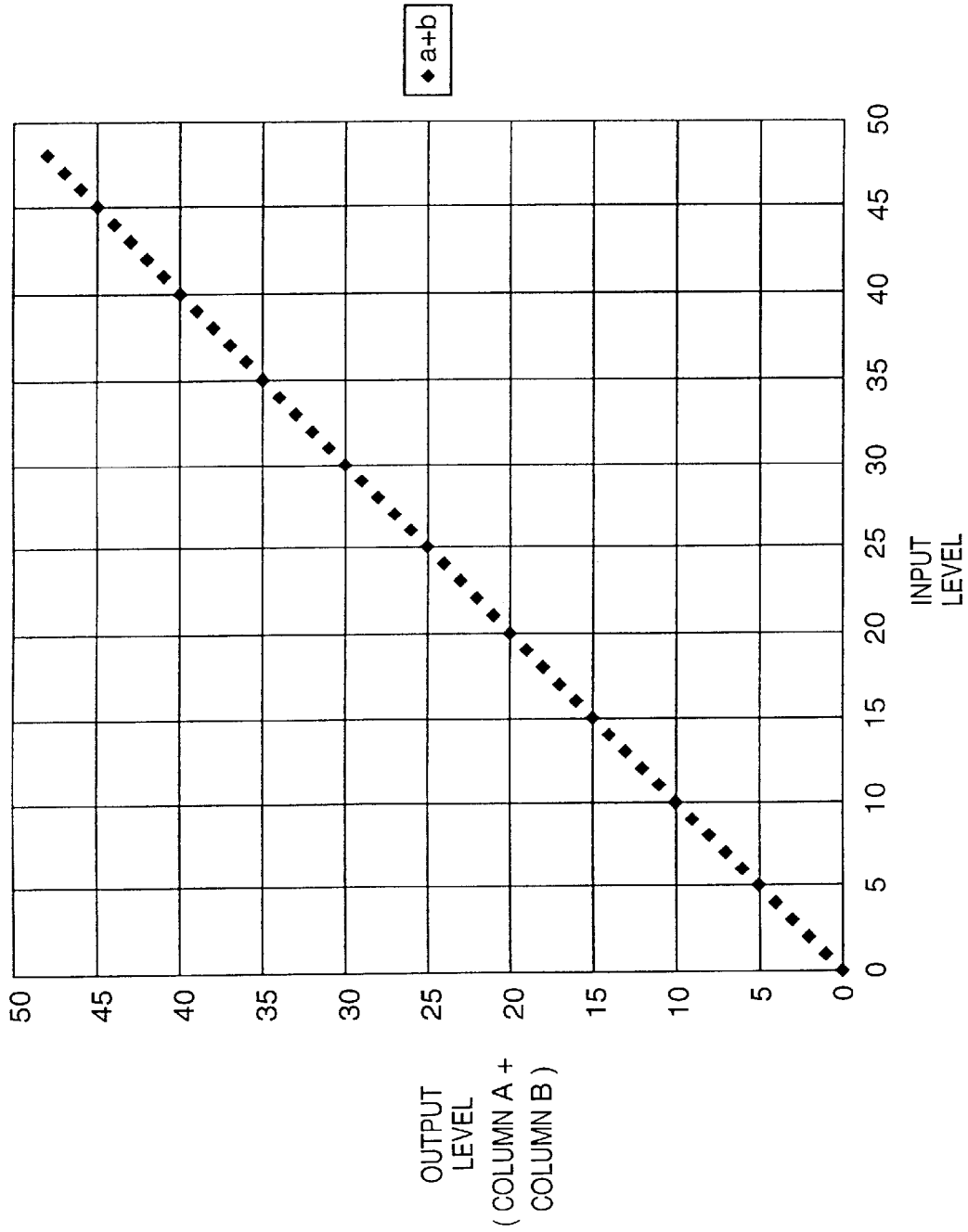
FIG. 10 is a graph showing the synthesized output characteristics of two pixels after the gradation correction using the LUT shown in FIG. 9 according to the first embodiment of the present invention.

FIG. 10 shows the synthesized output characteristics of two pixels after gradation correction using the LUT shown in FIG. 9 according to the first embodiment of the present invention. As shown in FIG. 10, linear characteristics are consequently obtained as the synthesized output characteristics for lines A and B.

Figure 11:
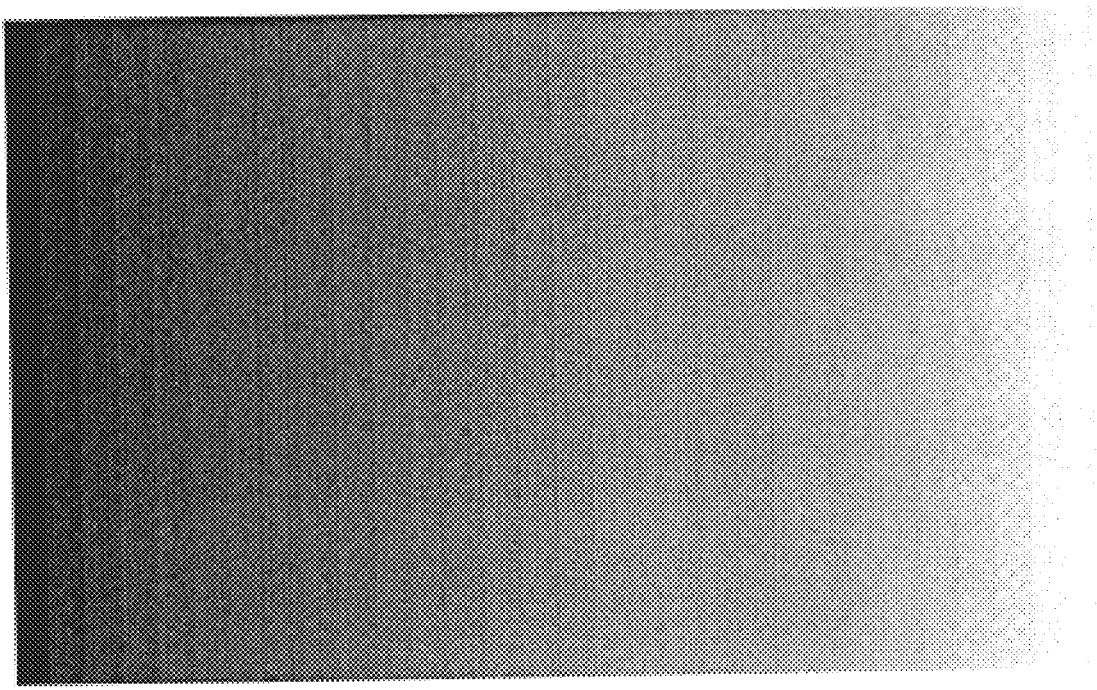
FIG. 11 shows an output example of a gradation pattern according to the first embodiment of the present invention.

When the LUT 211 shown in FIG. 4 is formed, data for realizing the characteristics shown in FIG. 9 are stored in the LUT 211 in a low-density region (for example, a region equal to or lower than a density value 0.5 is called a low-density region). FIG. 11 shows an output example of a gradation pattern in this case.

FIG. 11 shows an output example of a gradation pattern according to the first embodiment of the present invention. As shown in FIG. 11, a continuous, fine gradation pattern free from any stepwise changes in density can be obtained. Hence, when the LUT 211 with the aforementioned characteristics is used, an image can be reproduced after satisfactory gradation correction of input image data of 256 levels.

Second Embodiment

The arrangement of the second embodiment is basically the same as that in the first embodiment, and a repetitive explanation thereof will be avoided. However, an LUT as a basis of gradation correction is different from the first embodiment. In this embodiment, a case will be examined below wherein correction is made using characteristic curves for lines A and B shown in FIG. 12.

Figure 12:
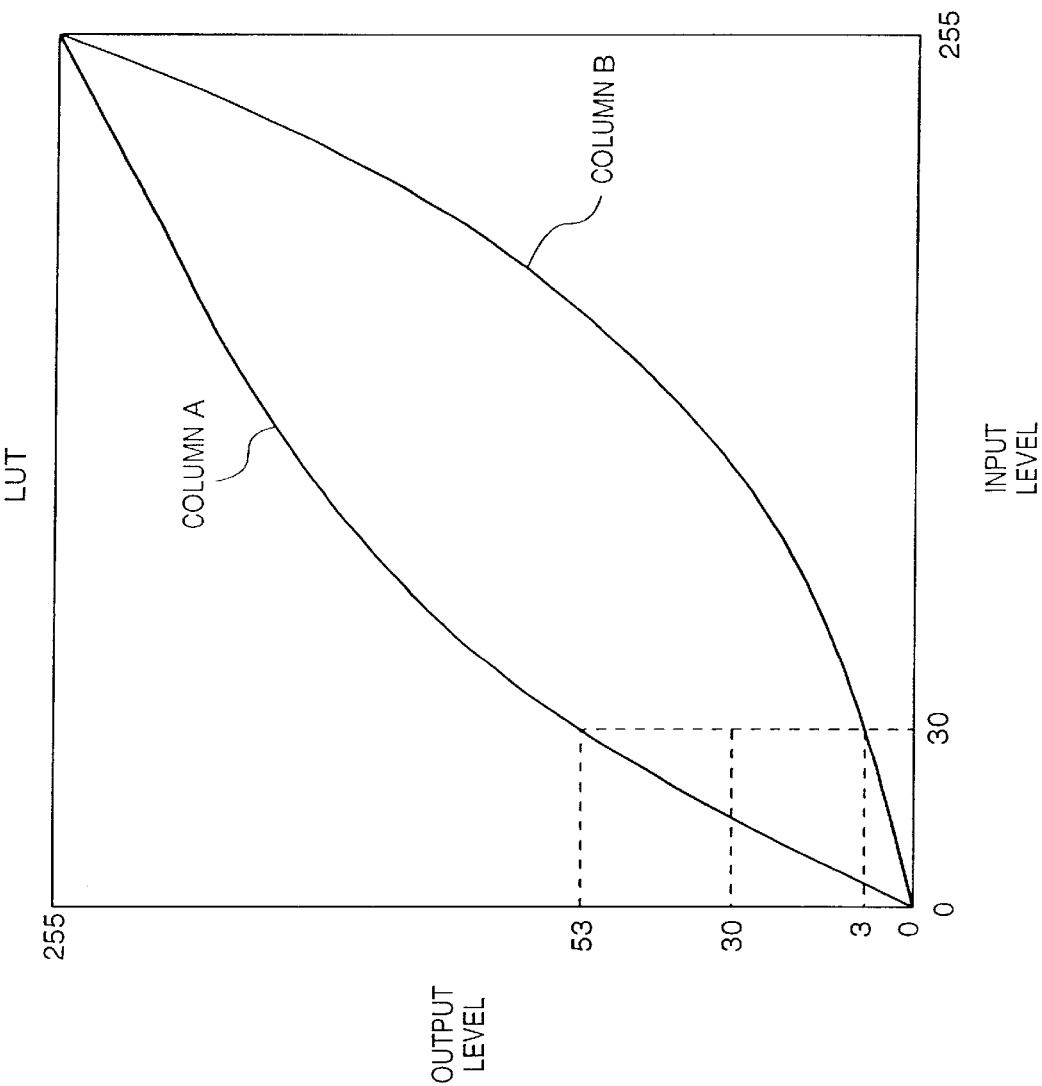
FIG. 12 is a graph showing the characteristics of an LUT which can be basically used in gradation correction according to the second embodiment of the present invention.

FIG. 12 shows the characteristics of a LUT that can be basically used in gradation correction according to the second embodiment of the present invention. In this case as well, the range from input levels 0 to 50 is presented in an enlarged scale as a low-density region in FIG. 12.

Figure 13:
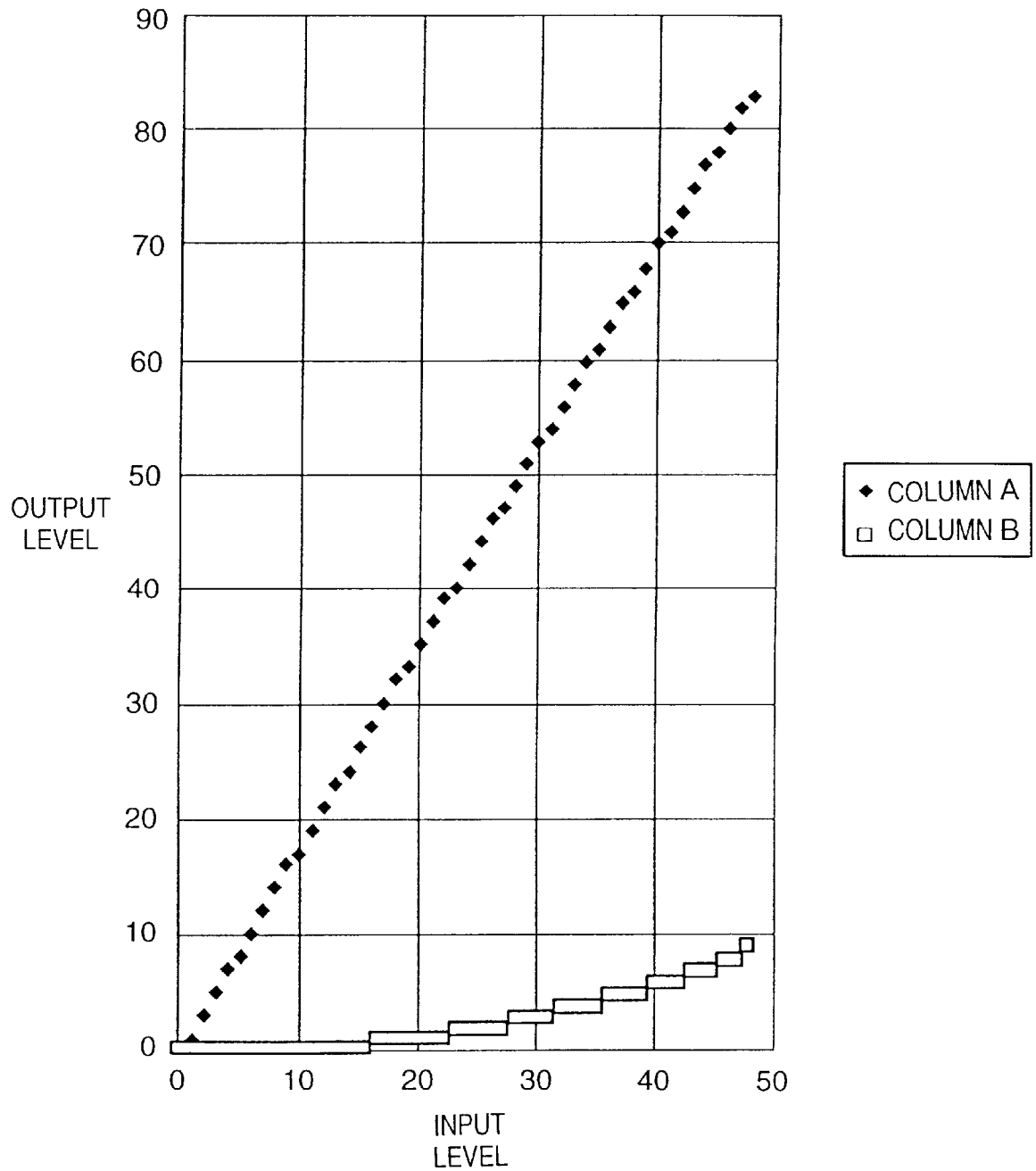
FIG. 13 is a graph showing the low-density region of the LUT shown in FIG. 12 in an enlarged scale.

FIG. 13 shows the low-density region in the LUT shown in FIG. 12 in an enlarged scale. As shown in FIG. 13, the characteristic curve for line B appears stepwise as in FIG. 7. In addition, since the characteristic curve for line A is an upward convex curve (FIG. 12), it cannot be expressed by a smoothly continuous curve for the same reason as in the characteristic curve for line B.

Figure 14:
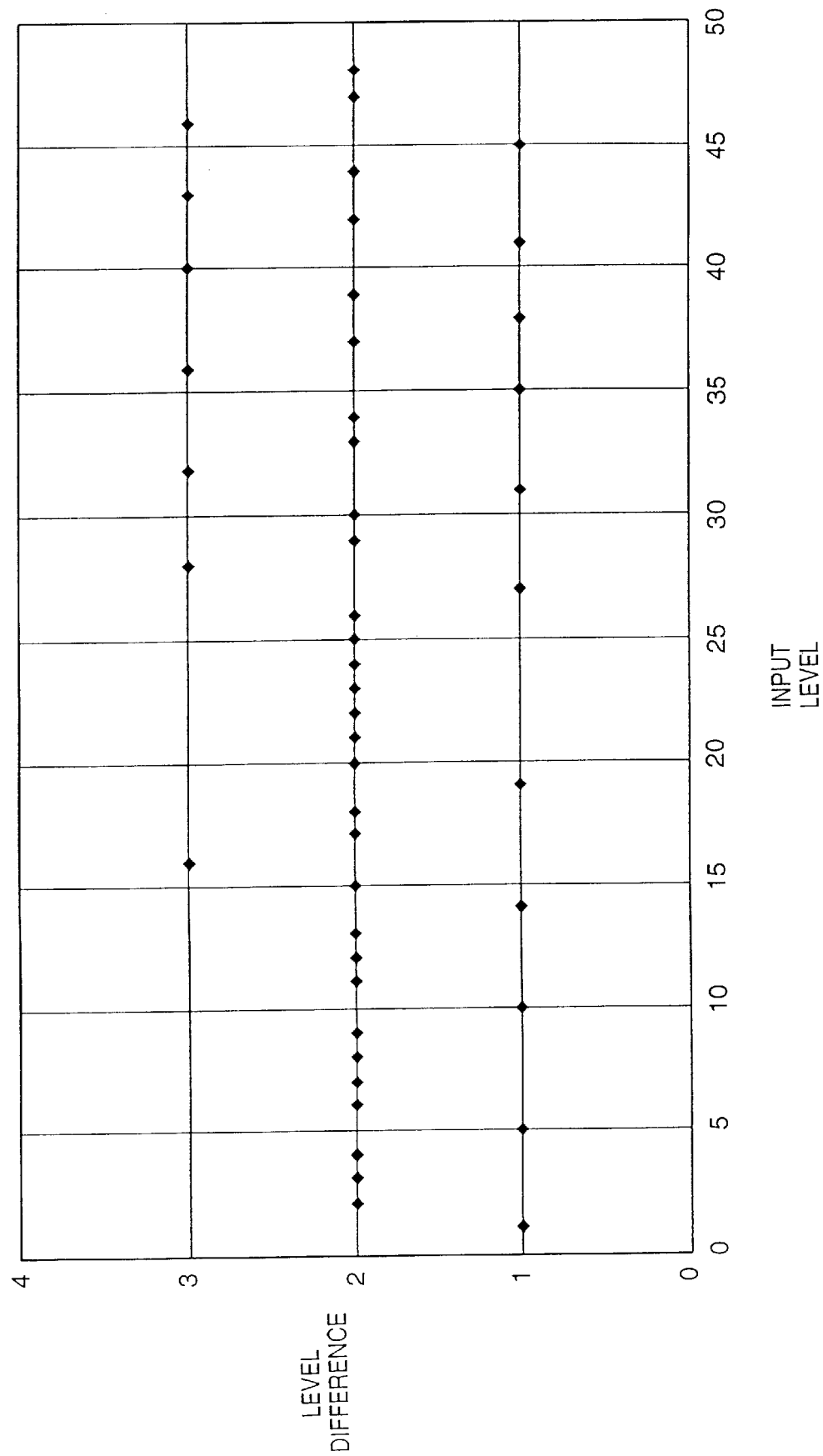
FIG. 14 is a graph showing the difference (level difference) between the sums of the output levels of two neighboring pixels in units of input levels after the gradation correction using the LUT shown in FIG. 13.

FIG. 14 shows the difference (level difference) between the sums of the output levels of two neighboring pixels in units of input levels after gradation correction using the LUT shown in FIG. 13. That is, FIG. 14 shows the difference (level difference) between the sum of the output levels of two neighboring pixels in lines A and B having the same input level, and the sum of the output levels of these two pixels having an input level larger by 1 than the former level in units of input levels after gradation correction using the LUT of FIG. 13.

As can be seen from FIG. 14, the level differences have characteristics which vary in the low-density region. Hence, if an original image is reproduced using such output characteristics, a pseudo edge is produced between input levels having a large level difference, and a portion corresponding to input levels having a small level difference appears whitish in the reproduced image. In order to prevent such problem, this embodiment uses an LUT shown in FIG. 15 in the low-density region.

Figure 15:
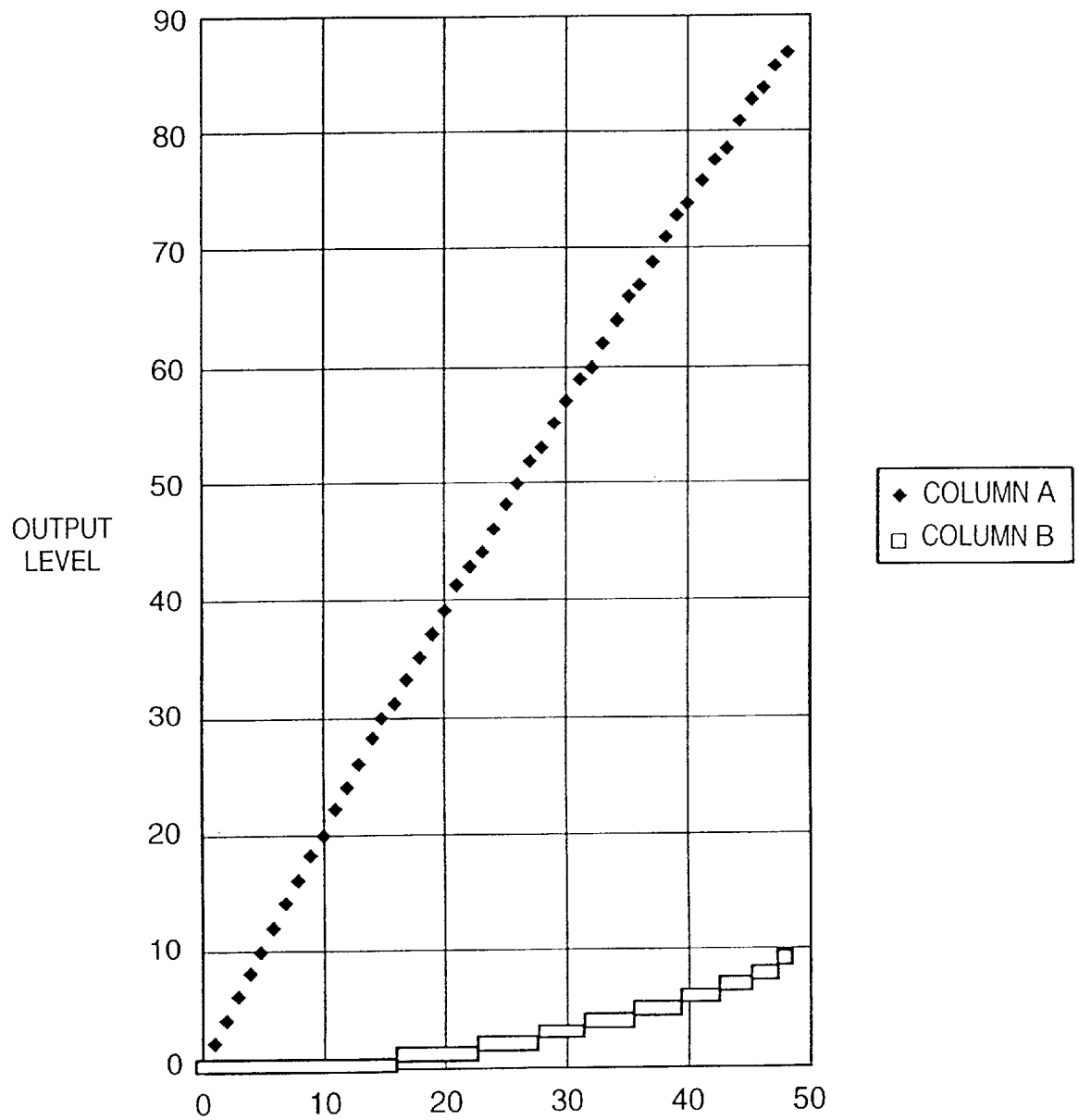
FIG. 15 is a graph showing an LUT for a low-density region according to the second embodiment of the present invention.
Figure 16:
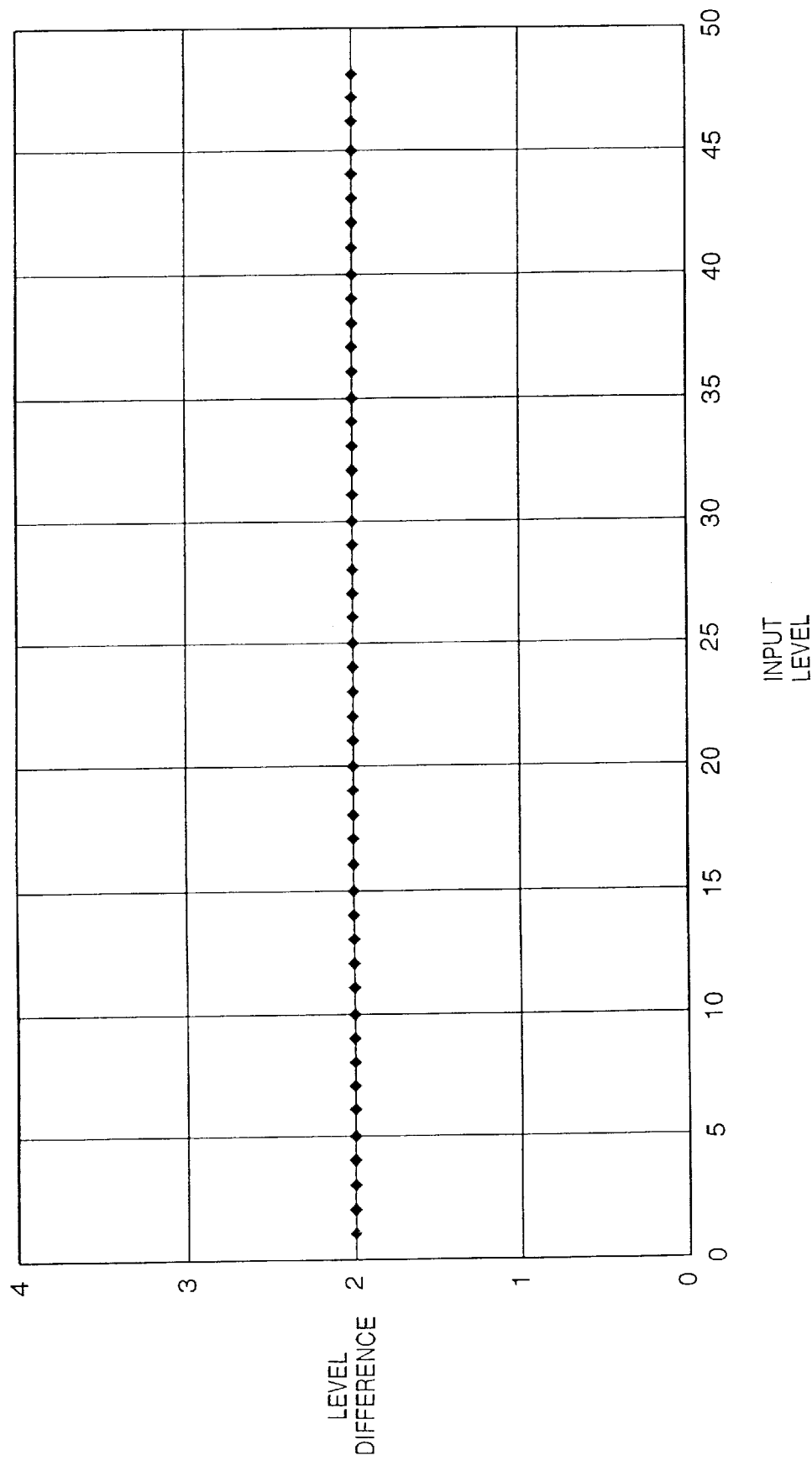
FIG. 16 is a graph showing the difference (level difference) between the sums of the output levels of two neighboring pixels in units of input levels after the gradation correction using the LUT shown in FIG. 15 according to the second embodiment of the present invention.

FIG. 15 shows the LUT used for the low-density region according to the second embodiment of the present invention. FIG. 16 shows the difference (level difference) between the sums of the output levels of two neighboring pixels in units of input levels after gradation correction using the LUT shown in FIG. 15 according to the second embodiment of the present invention. In this embodiment, as shown in FIG. 16, when the input level of the image signal falls within the range of the low-density region, the characteristic curve for line A in the LUT shown in FIG. 15 is set so that the level difference assumes a predetermined value (e.g., the level difference=2).

When the LUT 211 shown in FIG. 12 is formed, data for realizing the characteristics shown in FIG. 15 are stored in the LUT 211 in the low-density region, thus reproducing an image obtained by satisfactory gradation correction of input image data of 256 levels. In such case, when a gradation pattern is output, a continuous, fine gradation pattern free from any stepwise changes in density, as shown in FIG. 11, can be obtained as in the first embodiment. Hence, upon reproducing an original image, a high-quality image free from any pseudo edge and whitish portion can be reproduced.

Third Embodiment

In the first and second embodiments, the present invention is applied to a color digital copying machine. Also, the present invention is effective for a monochrome copying machine.

Figure 17:
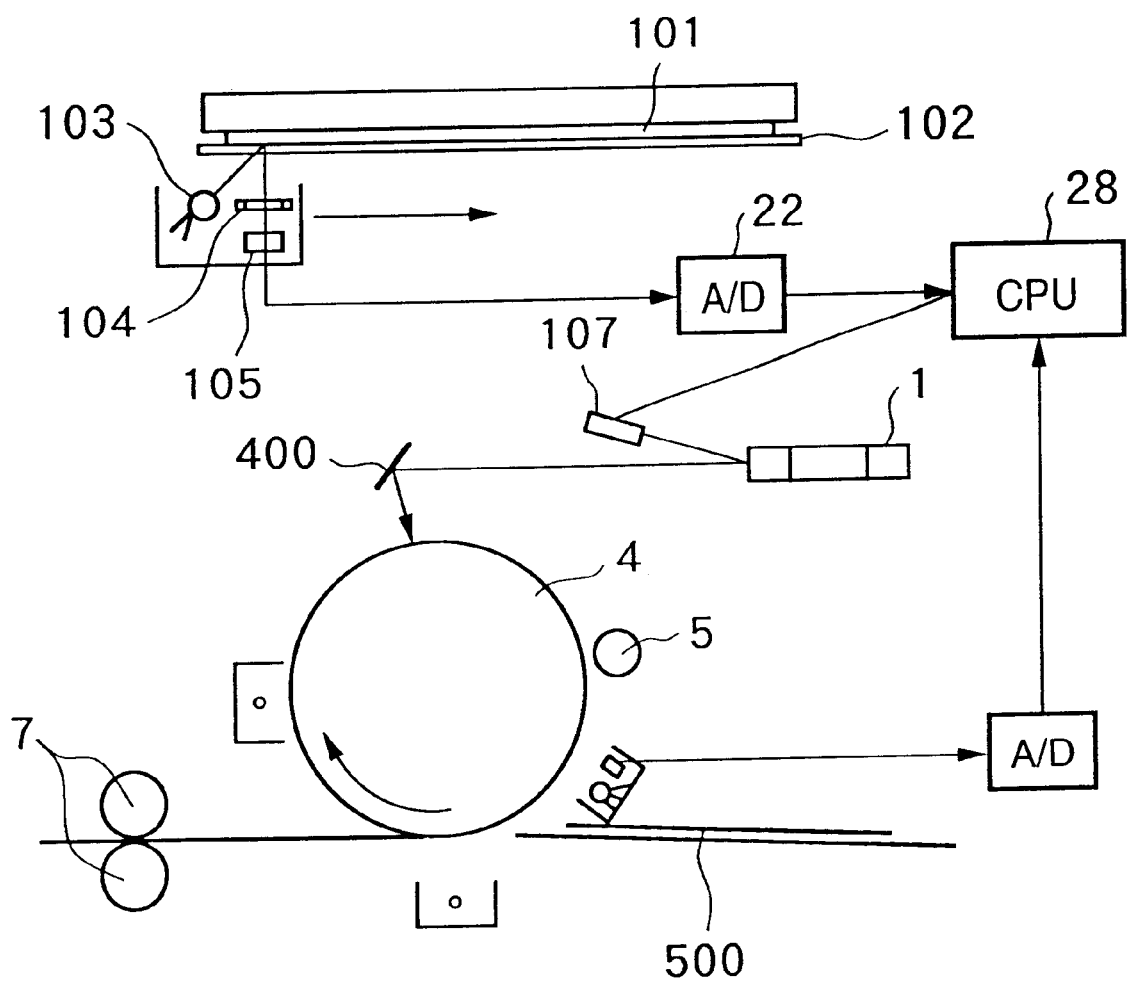
FIG. 17 is a schematic view showing the arrangement of a monochrome digital copying machine according to the third embodiment of the present invention.

FIG. 17 shows the arrangement of a monochrome digital copying machine according to the third embodiment of the present invention. The basic arrangement is the same as that of the color copying machine. The arrangement will be briefly described below. When a copy start key (not shown) is pressed, a CPU 28 starts an exposure scan of an original 101 placed on a platen 102 using an exposure lamp, 103. A reflected light image from the original 101 obtained by the exposure scan is formed on a CCD 105 via a lens 104, and the output from the CCD 105 is input to an analog/digital (A/D) converter 22.

The A/D converter 22 separates the incoming reflected light image from the original 101 into a plurality of pixels using a plurality of photoelectric conversion elements, and generates photoelectric conversion signals (digital signals) corresponding to the densities of these pixels.

The CPU 28 drives a pulse-width modulator (PWM) 107 in accordance with the input photoelectric conversion signals, and the PWM 107 outputs pulse signals having pulse widths corresponding to the levels of the input image signals. These pulse signals are input to a laser driver 1 for driving a laser light source 107.

A laser beam E emitted by a semiconductor laser in the laser driver 1 is swept by a rotary polygonal mirror 400 to scan the surface of a photosensitive drum 4, thus forming an electrostatic latent image. The electrostatic latent image formed on the photosensitive drum 4 is reverse-developed by a developer 5 to form a visible image (toner image). The toner image is transferred onto a recording sheet 500 conveyed by a convey means (not shown), and is thermally fixed by a roller 7.

Since operations other than the above-mentioned processing are the same as those in the first or second embodiment, a detailed description thereof will be omitted.

Other Embodiments

Note that the present invention may be applied to either a system constituted by a plurality of equipments (e.g., a host computer, interface device, reader, printer, and the like), or an apparatus consisting of a single equipment (e.g., a copying machine, facsimile apparatus, printer, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

Note that the above objects and embodiments have exemplified an electrophotography system. However, the present invention is not limited to such specific system, but the principle of the present invention can be applied to any other recording systems such as a thermal system, ink-jet system, and the like.

Also, density conversion may be implemented by calculations using an arithmetic circuit without using an LUT.

As described above, according to the embodiments mentioned above, an image processing apparatus and method having good gradation reproducibility can be provided.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus comprising:

correction means for performing gradation correction of odd- and even-numbered pixels neighboring in a predetermined scanning direction of an image represented by an input image signal using correction information, and selection means for selecting the correction information for use by the correction means from a plurality of types of correction information having different characteristics, wherein one of the plurality of types of correction information represents a downward convex correction characteristic curve, and at a given signal level of the input image signal where the correction information that represents the downward convex curve changes stepwise, another of the plurality of types of correction information changes in correspondence with the stepwise change at the given signal level of the input image signal, and the correction information selected by said selection means for performing the gradation correction of the odd-numbered pixels is different from the correction information selected for the even-numbered pixels.

2. The apparatus according to claim 1, wherein when said correction means performs gradation correction for the odd-numbered pixels in accordance with first correction information of the plurality of types of correction information, and for the even-numbered pixels in accordance with second correction information of the plurality of types of correction information, the second correction information represents a downward convex correction characteristic curve, and at a given signal level of the input image signal where the second correction information that represents the downward convex curve changes stepwise, the first correction information changes in a direction opposite to the stepwise change.

3. The apparatus according to claim 2, wherein during a section between a first signal level where the second correction information changes stepwise and a second signal level where the next stepwise change takes place, the first correction information is corrected in a direction opposite to the stepwise change at the first signal level.

4. The apparatus according to claim 1, wherein the plurality of types of correction information are pre-stored in a look-up table.

5. The apparatus according to claim 1, wherein said correction means includes first and second correction tables representing upward and downward convex correction characteristic curves as the first and second density correction information, and said correction means selects, when the density correction is performed, one of the first or second correction table in accordance with whether the pixel to be corrected is the odd- or even-numbered pixel.

6. An image processing apparatus comprising:

correction means for performing gradation correction of odd- and even-numbered pixels neighboring in a predetermined scanning direction of an image represented by an input image signal using correction information, and selection means for selecting the correction information for use by the correction means from a plurality of types of correction information having different characteristics, wherein the plurality of types of correction information respectively represent downward convex correction characteristic curves, and one of the plurality of types of correction information changes stepwise at a given signal level of the input image signal, another of the plurality of types of correction information which is different from the correction information that represents the downward convex curve which changes stepwise is corrected, so that a difference between a sum of corrected signal levels of the odd- and even-numbered pixels obtained when the odd- and even-numbered pixels at a first signal level of the input image signals are corrected by said correction means in accordance with the correction information that represents the downward convex curve which changes stepwise, and a sum of corrected signal levels of the odd- and even-numbered pixels obtained when the odd- and even-numbered pixels at a second signal level different a predetermined level from the first signal level of the input image signal are corrected by said correction means in accordance with the correction information that represents the downward convex curve which changes stepwise, assumes a predetermined value.

7. The apparatus according to claim 6, wherein when said correction means performs gradation correction of the odd- and even-line pixels in accordance with two types of correction information having different characteristics, the other correction information different from the correction information that represents the downward convex curve which changes stepwise is correction information in which a tangent to the correction characteristic curve has a larger slope than the correction information within a predetermined signal level range of the input image signal.

8. The apparatus according to claim 6, wherein the plurality of types of correction information are pre-stored in a look-up table.

9. An image processing method for performing gradation correction of odd- and even-numbered pixels neighboring in a predetermined scanning direction of an image represented by an input image signal by selecting from a plurality of types of correction information having different characteristics, wherein one of the plurality of types of correction information represents a downward convex correction characteristic curve, and at a given signal level of the input image signal where the correction information that represents the downward convex curve changes stepwise, another correction information changes in correspondence with the stepwise change, and the correction information used for performing the gradation correction of the odd-numbered pixels is different from the correction information selected for the even-numbered pixels.

10. The method according to claim 9, wherein when the gradation correction is performed for the odd-numbered pixels in accordance with first correction information of the plurality of types of correction information, and for the even-numbered pixels in accordance with second correction information of the plurality of types of correction information, the second correction information represents a downward convex correction characteristic curve, and at a given signal level of the input image signal where the second correction information that represents the downward convex curve changes stepwise, the first correction information changes in a direction opposite to the stepwise change.

11. The method according to claim 10, wherein during a section between a first signal level where the second correction information changes stepwise and a second signal level where the next stepwise change takes place, the first correction information is corrected in a direction opposite to the stepwise change at the first signal level.

12. An image processing method for performing gradation correction of odd- and even-line pixels neighboring in a predetermined scanning direction of an image represented by an input image signal in accordance with a plurality of types of correction information having different characteristics, wherein when the plurality of types of correction information respectively represent downward convex correction characteristic curves, and one of the plurality of types of correction information that represent the downward convex curves changes stepwise at a given signal level of the input image signal, another correction information which is different from the correction information that represents the downward convex curve which changes stepwise is corrected, so that a difference between a sum of corrected signal levels of the odd- and even-line pixels obtained when the odd- and even-line pixels at a first signal level of the input image signals are corrected in accordance with the correction information that represents the downward convex curve which changes stepwise, and a sum of corrected signal levels of the odd- and even-line pixels obtained when the odd- and even-line pixels at a second signal level different a predetermined level from the first signal level of the input image signal are corrected in accordance with the correction information that represents the downward convex curve which changes stepwise, assumes a predetermined value.

13. The method according to claim 12, wherein when the gradation correction of the odd- and even-line pixels is performed in accordance with two types of correction information having different characteristics, the other correction information different from the correction information that represents the downward convex curve which changes stepwise is correction information in which a tangent to the correction characteristic curve has a larger slope than the correction information within a predetermined signal level range of the input image signal.

14. An image processing apparatus comprising:

an input unit for inputting image data composed of a plurality of pixels; and a correction unit for performing density correction of the input image data, wherein said correction unit corrects a density of odd-numbered pixels extending in a predetermined direction of the image data using one of a first density-correction characteristic and a second density-correction characteristic, and corrects a density of even-numbered pixels extending in the predetermined direction of the image data using the other of the first density-correction characteristic and the second density-correction characteristic, and the first density-correction characteristic changes stepwise in a low-density region at a given input level, and the second density-correction characteristic is set to change step-wise at the given input level so that a synthesized output summing neighboring corrected odd and even-numbered pixels is substantially free of stepwise changes.

15. The apparatus according to claim 14, further comprising an image forming unit for forming an image using image data composed of the corrected odd and even-numbered pixels.

16. The apparatus according to claim 14, wherein said correction unit includes a look-up table in which the first and second density-correction characteristics are stored.

17. The apparatus according to claim 14, the second density-correction characteristic is set so that a gradation characteristic of an image formed using the corrected odd and even-numbered pixels changes continuously.

18. The apparatus according to claim 17, wherein the second density-correction characteristic is set so that a gradation characteristic of an image formed using the corrected odd and even-numbered pixels changes linearly.

19. The apparatus according to claim 14, wherein the second density-correction characteristic is set so that a difference between a synthesized output summing neighboring corrected odd and even-numbered pixels obtained when the input image data is a first signal level, and a synthesized output summing neighboring corrected odd and even-numbered pixels obtained when the input image data is a second signal level, which differs by a predetermined amount from the first signal level, is a predetermined value.

20. A color copying apparatus comprising the apparatus according to claim 14.

21. A monochrome copying apparatus comprising the apparatus according to claim 14.

22. An image processing method comprising the steps of:
inputting image data composed of a plurality of pixels;
correcting a density of odd-numbered pixels extending in a predetermined direction of the image data using one of a first density-correction characteristic and a second density-correction characteristic; and
correcting a density of even-numbered pixels extending in the predetermined direction of the image data using the other of the first density-correction characteristic and the second density-correction characteristic,
wherein the first density-correction characteristic changes step-wise in a low-density region at a given input level, and the second density-correction characteristic is set to change step-wise at the given input level so that a synthesized output summing neighboring corrected odd and even-numbered pixels is substantially free of step-wise changes.

23. The method according to claim 22, further comprising the step of forming an image using image data composed of the corrected odd and even-numbered pixels.

24. The method according to claim 22, wherein the correction of the odd-numbered and even-numbered pixels is performed using the first and second density-correction characteristics stored in a look-up table.

25. The method according to claim 22, wherein the other of the first and second density-correction characteristics is set so that a gradation characteristic of an image formed using the corrected odd and even-numbered pixels changes continuously.

26. The method according to claim 25, wherein the other of the first and second density-correction characteristics is set so that a gradation characteristic of an image formed using the corrected odd and even-numbered pixels changes linearly.

27. The method according to claim 22, wherein the second density-correction characteristic is set so that a difference between a synthesized output summing neighboring corrected odd and even-numbered pixels obtained when the input image data is a first signal level, and a synthesized output summing neighboring corrected odd and even-numbered pixels obtained when the input image data is a second signal level, which differs by a predetermined amount from the first signal level, is a predetermined value.

28. A computer readable storage medium that stores program code for executing an image processing method comprising the steps of:
inputting image data composed of a plurality of pixels;
correcting a density of odd-numbered pixels extending in a predetermined direction of the image data using one of a first density-correction characteristic and a second density-correction characteristic; and
correcting a density of even-numbered pixels extending in the predetermined direction of the image data using the other of the first density-correction characteristic and the second density-correction characteristic,
wherein the first density-correction characteristic changes step-wise in a low-density region at a given input level, and the second density-correction characteristic is set to change step-wise at the given input level so that a synthesized output summing neighboring corrected odd and even-numbered pixels is substantially free of step-wise changes.

29. The computer readable storage medium according to claim 28, further storing program code for the step of forming an image using image data composed of the corrected odd and even-numbered pixels.

30. The computer readable storage medium according to claim 28, wherein the correction of the odd-numbered and even-numbered pixels is performed using the first and second density-correction characteristics stored in a look-up table.

31. The computer readable storage medium according to claim 28, wherein the other of the first and second density-correction characteristics is set so that a gradation characteristic of an image formed using the corrected odd and even-numbered pixels changes continuously.

32. The computer readable storage medium according to claim 31, wherein the other of the first and second density-correction characteristics is set so that a gradation characteristic of an image formed using the corrected odd and even-numbered pixels changes linearly.

33. The computer readable storage medium according to claim 28, wherein the second density-correction characteristic is set so that a difference between a synthesized output summing neighboring corrected odd and even-numbered pixels obtained when the input image data is a first signal level, and a synthesized output summing neighboring corrected odd and even-numbered pixels obtained when the input image data is a second signal level, which differs by a predetermined amount from the first signal level, is a predetermined value.

* * * * *

UNITED STATES PATENT AND TRADEMARK OFFICE
CERTIFICATE OF CORRECTION

PATENT NO. : 6,535,302 B1                                   Page 1 of 1
DATED     : March 18, 2003
INVENTOR(S) : Yuichi Ikeda et al.

It is certified that error appears in the above-identified patent and that said Letters Patent is hereby corrected as shown below:

Column 8,
Line 60, "shown" should read -- shown in --.

Column 12,
Line 43, "table" should read -- tables --.

Column 13,
Line 15, "even-line" should read -- even-numbered --.

Column 14,
Line 53, "step-wise" should read -- stepwise --;
Lines 54 and 59, "odd" should read -- odd- --;
Line 64, "claim 14," should read -- claim 14, wherein --; and
Line 66, "odd" should read -- odd- --.

Column 15,
Lines 4, 8 and 10, "odd" should read -- odd- --;
Lines 29 and 31, "step-wise" should read -- stepwise --;
Lines 32, 37 and 45, "odd" should read -- odd- --;
Lines 50 and 55, "odd" should read -- odd- --.

Column 16,
Lines 2, 22, 28, 37, 42, 47 and 50, "odd" should read -- odd- --; and
Lines 19 and 21, "step-wise" should read -- stepwise --.

Signed and Sealed this

Ninth Day of September, 2003

JAMES E. ROGAN
*Director of the United States Patent and Trademark Office*